US012757866B2

(12) United States Patent
Jiang

(10) Patent No.: US 12,757,866 B2
(45) Date of Patent: Oct. 13, 2026

(54) PET LITTER TRAY

(71) Applicant: Karen Jiang, Weston, MA (US)

(72) Inventor: Karen Jiang, Weston, MA (US)

( * ) Notice: Subject to any disclaimer, the term of this patent is extended or adjusted under 35 U.S.C. 154(b) by 0 days.

(21) Appl. No.: 19/288,112

(22) Filed: Aug. 1, 2025

(65) Prior Publication Data

US 2026/0096536 A1 Apr. 9, 2026

(30) Foreign Application Priority Data

Oct. 7, 2024 (CN) ......................... 202422406098.2

(51) Int. Cl.

*A01K 1/03* (2006.01)
*A01K 1/01* (2006.01)
*A01K 5/01* (2006.01)

(52) U.S. Cl.

CPC ............ *A01K 1/032* (2013.01); *A01K 1/0107* (2013.01); *A01K 5/0135* (2013.01)

(58) Field of Classification Search

CPC ..... A01K 1/032; A01K 1/0107; A01K 5/0135
See application file for complete search history.

(56) References Cited

U.S. PATENT DOCUMENTS 4,117,804 A * 10/1978 Moore ................. A01K 1/0114 119/166
4,281,624 A 8/1981 Raines
5,090,357 A * 2/1992 Pucci ................... A01K 63/006 30/106
5,148,768 A 9/1992 Hinton
5,471,950 A * 12/1995 White .................. A01K 1/0245 119/497
5,503,107 A * 4/1996 Satcher ................ A01K 1/0236 119/497
6,352,076 B1 * 3/2002 French ..................... A61D 7/04 119/420
D464,224 S * 10/2002 Moore ......................... D30/162
6,508,358 B2 * 1/2003 Cheng .................... A45C 13/02 190/111
6,971,333 B1 * 12/2005 Hearrell ............... A01K 1/0245 119/482
D534,695 S 1/2007 Van Skiver (Continued)

FOREIGN PATENT DOCUMENTS

KR 20090003785 A * 1/2009 ............ A01K 1/031

*Primary Examiner* — Ebony E Evans
(74) *Attorney, Agent, or Firm* — Goldstein Law Offices, P.C.

(57) ABSTRACT

A pet litter tray enabling easy access, organization, and cleaning comprising a tray and an interchangeable divider. The tray comprising a base, a first sidewall, a second sidewall, a back wall, a front wall, a pair of receptacles, and a lip. The first sidewall, the second sidewall, the back wall, and the front wall extending upwardly from the base, defining an interior compartment. The interior compartment comprising a food area and a waste area. The pair of receptacles extending inwardly from the first and second sidewall, configured to slidably receive the interchangeable divider. The interchangeable divider comprising a flat planar body including a top end, a bottom end, a front surface, a back surface, a panel side wall, and one or more holes extending entirely through the front surface to the back surface. The interchangeable divider defines the waste area and the food area when attached to the tray.

17 Claims, 17 Drawing Sheets

(56) References Cited

U.S. PATENT DOCUMENTS

| | | | | |
|---|---|---|---|---|
| D612,113 | S | 3/2010 | Petersen | |
| D636,950 | S | 4/2011 | Lawson et al. | |
| 8,336,500 | B1 * | 12/2012 | Britt | A01K 1/0107 119/497 |
| 8,640,648 | B2 | 2/2014 | Lathim | |
| D702,002 | S | 4/2014 | Petrek | |
| 9,370,165 | B2 * | 6/2016 | de Bien | A01K 1/034 |
| D769,548 | S | 10/2016 | Spiegel | |
| D846,815 | S | 4/2019 | Darkwah | |
| D947,469 | S * | 3/2022 | Schuler | D30/161 |
| 11,399,509 | B2 * | 8/2022 | Watson | A01K 15/02 |
| D1,000,007 | S | 9/2023 | Zhang | |
| 11,919,704 | B1 * | 3/2024 | Sauer | B65D 11/188 |
| 12,048,289 | B1 | 7/2024 | Lee et al. | |
| D1,049,517 | S | 10/2024 | Zhang | |
| 2004/0139922 | A1 * | 7/2004 | Kost | A01K 1/0245 119/482 |
| 2012/0266824 | A1 | 10/2012 | Trauttmansdorf et al. | |
| 2015/0096649 | A1 | 4/2015 | Lathrim | |
| 2015/0143750 | A1 | 5/2015 | Jalbert et al. | |
| 2019/0281786 | A1 * | 9/2019 | Akers, II | A01K 1/0107 |

* cited by examiner

PET LITTER TRAY

CROSS-REFERENCING

This application claims the benefit of foreign priority of China Patent Application No. 202422406098.2, filed on Oct. 7, 2024, the contents of which are relied upon and incorporated herein by reference in their entirety.

TECHNICAL FIELD

The present disclosure relates generally to pet litter trays. More particularly, the present disclosure relates to a pet litter tray with selectively interchangeable dividers separating the waste area and the food area for easy accessibility for pets and cleaning.

BACKGROUND

Pet owners have long recognized the importance of having an accessible and clean litter tray and feeding area for their pets to use to relieve themselves and eat. Additionally, pet owners have long recognized the importance of organizing and easily storing their pet's accessories for transport. However, traditional pet litter trays do not address these concerns. Indeed, traditional pet litter trays may be detrimental as they frequently create a mess, are difficult to clean, and are challenging to store and transport.

Currently, traditional pet litter trays and feeding areas fail to address the need for easy accessibility and organization. These litter trays and feeding areas often have fixed panels which frequently lead to limited accessibility points for pets and issues with cleaning the litter tray. The pet's food, litter, and excrement often gets kicked around creating a large mess for the pet owner to clean on a regular basis. When the pet food, litter, and excrement get mixed together the food is no longer suitable for consumption, resulting in the pet owner having to purchase and replace the pet food more frequently. Moreover, such litter trays occupy a significant amount of space in a household and are difficult to store and transport.

Accordingly, there is a need for a pet litter tray with a plurality of selectively interchangeable dividers, allowing separation of the feeding area and the waste area. Such a pet litter tray will provide an efficient product to enable pets to easily access their food and litter tray, contain messes, and be arranged for easy transport and storage.

In the present disclosure, where a document, act, or item of knowledge is referred to or discussed, this reference of discussion is not an admission that the document, act, or item of knowledge or any combination thereof was at the priority date, publicly available, known to the public, part of common general knowledge or otherwise constitutes prior art under the applicable statutory provisions, or is known to be relevant to an attempt to solve any problems with which the present disclosure is concerned.

While certain aspects of conventional technologies have been discussed to facilitate the present disclosure, no technical aspects are disclaimed, and it is contemplated that the claims may encompass one or more of the conventional technical discussed herein.

BRIEF SUMMARY

One aspect of an example embodiment in the present disclosure is to provide a pet litter tray which enables easy access, organization, and cleaning. Accordingly, the present disclosure provides a pet litter tray with a plurality of selectively interchangeable dividers which permit separation of the food area and the waste area, enabling easy access and cleanliness. Such a pet litter tray will provide an efficient means for pets to eat and relieve themselves in an organized manner. Accordingly, the present disclosure provides a pet litter tray with a tray and an interchangeable divider which can be selectively attached or detached to the tray, thereby creating multiple separated sections within the tray.

The tray comprising a base, a first sidewall, a second sidewall, a back wall, and a front wall. The first sidewall and the second sidewall interconnect the back wall and the front wall. The first sidewall, the second sidewall, the back wall, and the front wall extend upwardly from the base defining an interior compartment. The interior compartment comprises a food area and a waste area. In embodiments, the base is sloped and may include grates. The tray includes a pair of receptacles extending inwardly, substantially perpendicular from the first sidewall and the second sidewall. In embodiments, the pair of receptacles are disposed on the base at the junctures between the first sidewall and the second sidewall, respectively. In other embodiments, the pair of receptacles are disposed on the first sidewall and the second sidewall, only. The pair of receptacles define the boundary between the food area and the waste area. The pair of receptacles are configured to receive the interchangeable divider. In embodiments, the pair of receptacles include a groove configured to slidably receive the interchangeable divider. In embodiments, a first lip extends outwardly around the perimeter of the tray. In embodiments, the first lip extends substantially perpendicular to a top end of the first sidewall, the second sidewall, the back wall, and the front wall.

In embodiments, the first sidewall and the second sidewall undulate, such that the first sidewall and the second sidewall include a varying height. For example, the first sidewall and the second sidewall include a first portion adjacent to the front wall and a second portion adjacent to the back wall, wherein the first portions each include a height smaller than the second portions. This allows pets to easily access the interior compartment from the sides or front of the tray. In embodiments, the first sidewall and the second sidewall include a unitary height, such that the height of the first sidewall and the second sidewall are substantially equivalent to the back wall. In embodiments, the back wall includes a height substantially similar to the interchangeable divider when the interchangeable divider is attached to the tray. In embodiments, the front wall and the back wall include the substantially equal heights. The front wall includes an opening for pets to access the interior compartment. In embodiments, the tray may include multiple openings and the opening may be located on the first sidewall, the second sidewall, the front wall, and the back wall. In yet another embodiment, the front wall and the back wall include varying heights, such that the front wall is shorter than the back wall, enabling pets to step over the front wall to access the interior compartment. In embodiments, the front wall includes a height that is substantially equal to the height of the first portions of the first and second sidewalls.

In embodiments, the pair of receptacles comprises any locking system, such tracks, grooves, channels, ribs, alignment posts, magnets, snap-fit tabs, sliding mechanisms, friction-fit methods, hinges, clips, or a similar equivalent. In embodiments, the pair of receptacles 27 comprises a single receptacle, a plurality of side walls, or any equivalent structure capable of receiving and stabilizing the interchangeable divider 40. In embodiments, the tray comprises wood, plastic, stainless steel, ceramic, polypropylene, or an equivalent material capable of supporting a pet. In embodiments, the tray comprises a paper-based material and is disposable.

The interchangeable divider, configured to selectively attach and detach from the tray, comprises a flat planar body including a top end, a bottom end, a front surface, a back surface, and a panel side wall. The front surface is substantially parallel to the back surface. The panel side wall extends substantially perpendicular between the front surface and the back surface. One or more holes extend entirely through the interchangeable divider from the front surface to the back surface. The one or more holes comprise any shape, such as a square, rectangle, trapezoid, circle, or wired bars. The interchangeable divider slidably inserts and exits the pair of receptacles. The interchangeable divider is configured to divide the waste area and the food area. The waste area is adjacent to the front wall and is configured to receive the pet's waste. The food area is adjacent to the back wall and is configured to receive and store pet food. The waste area and the food area are configured to secure the waste and the pet food, respectively, and prevent the waste and food from intermixing and creating a mess. In operation of some embodiments, the bottom end of the interchangeable divider is disposed adjacent to the base when positioned within the pair of receptacles. In operation of some embodiments, the bottom end of the interchangeable divider makes contact with the base when positioned within the pair of receptacles. In embodiments, the interchangeable divider is substantially rectangular in shape and includes a width substantially equal to the width of the interior compartment. In embodiments, the interchangeable divider decreases in width from the top end to the bottom end, such that the interchangeable divider includes a smaller width adjacent to the base and a greater width adjacent to the top end of the first sidewall and the second sidewall. The interchangeable divider may comprise of wood, plastic, stainless steel, polypropylene, or an equivalent material. In embodiments, the interchangeable divider may comprise of paper-based material and is disposable.

In operation of some embodiments, the interchangeable divider is selectively received by the pair of receptacles by first aligning the interchangeable divider with the pair of receptacles. The user then vertically translates the interchangeable divider downward towards the base. The interchangeable divider engages the grooves of the pair of receptacles and makes contact with the base. In operation of some embodiments, the pair of receptacles 27 is positioned on the tray 20 horizontally or at an angle, thereby enabling the interchangeable divider 40 to be slidably attached to the pair of receptacles 27 horizontally, at an angle, or in an equivalent means. In operation of some embodiments, the interchangeable divider is selectively disengaged from the pair of receptacles by vertically translating the interchangeable divider upwardly, thereby sliding the divider out of the grooves of the pair of receptacles. Once disengaged, the user can store the interchangeable divider.

In embodiments, the pet litter tray further includes a removeable floor plate that is selectively mountable over the waste area. The floor plate includes a plurality of apertures configured to filter pet waste excreted by the pet, by enabling the pet waste to fall through the apertures into the base. In this way, the floor plate enables storage of the pet waste underneath the floor plate to prevent messes or the intermixing of the pet waste and the pet food. The floor plate comprises a proximal end, a top surface, a bottom surface, a plate side wall, and the plurality of apertures. The top surface is substantially parallel to the bottom surface. The plate side wall extends substantially perpendicularly between the top surface and the bottom surface. The plurality of apertures extend entirely through the floor plate, from the top surface to the bottom surface, enabling pet waste to fall through the floor plate into the waste area. The floor plate includes a first corner, a second corner, a third corner, and a fourth corner. The first corner and the second corner are adjacent to the proximal end. The third corner and the fourth corner include an indent configured to engage the pair of receptacles. In embodiments, the bottom surface includes a plurality of beams which provide structural support for the floor plate. In embodiments, the floor plate comprises wood, plastic, stainless steel, ceramic, polypropylene, or an equivalent material capable of supporting a pet. In embodiments, the floor plate may comprise of a paper-based material and is disposable.

In operation of some embodiments, the floor plate is attached to the pet litter tray by first aligning the floor plate to the waste area. The user aligns the third corner and the fourth corner to the pair of receptacles. The user then vertically translates the floor plate downward, such that the plurality of beams contact the base. The proximal end is positioned adjacent to the front wall, and the third and fourth corners engage the pair of receptacles.

The pet litter tray may be stacked for easy storage and transportation. In operation of embodiments, the user vertically translates the interchange divider upwardly away from the base, disengaging the divider from the pair of receptacles. In operation of some embodiments, the user vertically translates the floor plate upwardly away from the base, removing it from the waste area. Once the interchangeable divider and the floor pet are removed, the user places the interchangeable divider and the floor plate into the interior compartment of the tray. The user repeats these steps with all additional pet litter trays. The user then stacks each pet litter tray on top of each other, such that the trays of the additional pet litter trays sit inside the bottom pet litter tray's interior compartment. The first lip of each of the pet litter trays are aligned and engage each other which supports and stabilizes each of the pet litter trays. This reduces the amount of space required for storage and enables easier transportation.

In embodiments, the pet litter tray further includes a lid. The lid comprises a roof, a third sidewall, a fourth sidewall, a closed sidewall, and an open sidewall. The third sidewall and the fourth sidewall interconnect the closed sidewall and the open sidewall. The third sidewall, the fourth sidewall, the closed sidewall, and the open sidewall extend downwardly from the roof. A second lip extends outwardly, substantially perpendicular to a bottom end of the third sidewall, the fourth sidewall, the closed sidewall, and the open sidewall. In embodiments, the second lip is substantially similar in size to the first lip. The open sidewall includes an opening substantially the same width as the opening of the front wall, enabling easy access to the enclosed pet litter tray. When the lid is placed onto the tray, the opening of the open sidewall aligns with the opening of the front wall creating a larger opening for ingress or egress of the pet. The lid comprises of wood, plastic, stainless steel, ceramic, polypropylene, or an equivalent material. In embodiments, the lid comprises a paper-based material and is disposable. In embodiments, the pair of receptacles is disposed on the base, the lid, the sidewalls, the front wall, the back wall, or any combination thereof.

The enclosed pet litter tray may be stacked for easy storage and transportation. In operation of some embodiments, the user vertically translates the lid upwardly, removing the lid from the tray. The user then vertically translates the interchangeable divider upwardly, disengaging the interchangeable divider from the pair of receptacles. The user then vertically translates the floor plate upwardly away from the base, disengaging the floor plate from the waste area. The user then places the interchangeable divider and the floor plate into the interior compartment of the tray. Next, the user rotates the lid ninety degrees such that the third sidewall, the fourth sidewall, the closed sidewall, and the open sidewall extend upwardly from the roof. The user then aligns the first lip and the second lip and vertically translates the lid downward, towards the tray until the first lip and the second lip engage. This secures the lid to the tray, minimizing the space occupied by the pet litter tray.

In embodiments, the lid, tray, interchangeable divider, and floor plate are connected by a mechanical fastener, an adhesive, or any equivalent fastener that connects the components.

In operation of some embodiments, the user assembles the pet litter tray by first attaching the interchangeable divider to the tray. The user aligns the interchangeable divider with the grooves of the pair of receptacles and vertically translates the interchangeable divider downwardly towards the base and into the grooves, thereby engaging the pair of receptacles. In operation of embodiments, the user then aligns the floor plate to the waste area and vertically translates the floor plate downwardly, such that the plurality of beams contact the base and the proximal end is positioned adjacent to the front wall. The user then fills the food area with pet food. In operation of some embodiments, the user attaches the lid to the tray by aligning the first lip with the second lip and the opening of the lid with the opening of the front wall then vertically translating the lid downwardly toward the tray, engaging the first lip and the second lip. The pet can then access and use the pet litter tray.

The present disclosure addresses at least one of the foregoing disadvantages. However, it is contemplated that the present disclosure may prove useful in addressing other problems and deficiencies in a number of technical areas. Therefore, the claims should not necessarily be construed as limiting to addressing any of the particular problems or deficiencies discussed hereinabove. To the accomplishment of the above, this disclosure may be embodied in the form illustrated in the accompanying drawings. The drawings are exemplary only, variations are contemplated as being part of the disclosure. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

Figure 1:
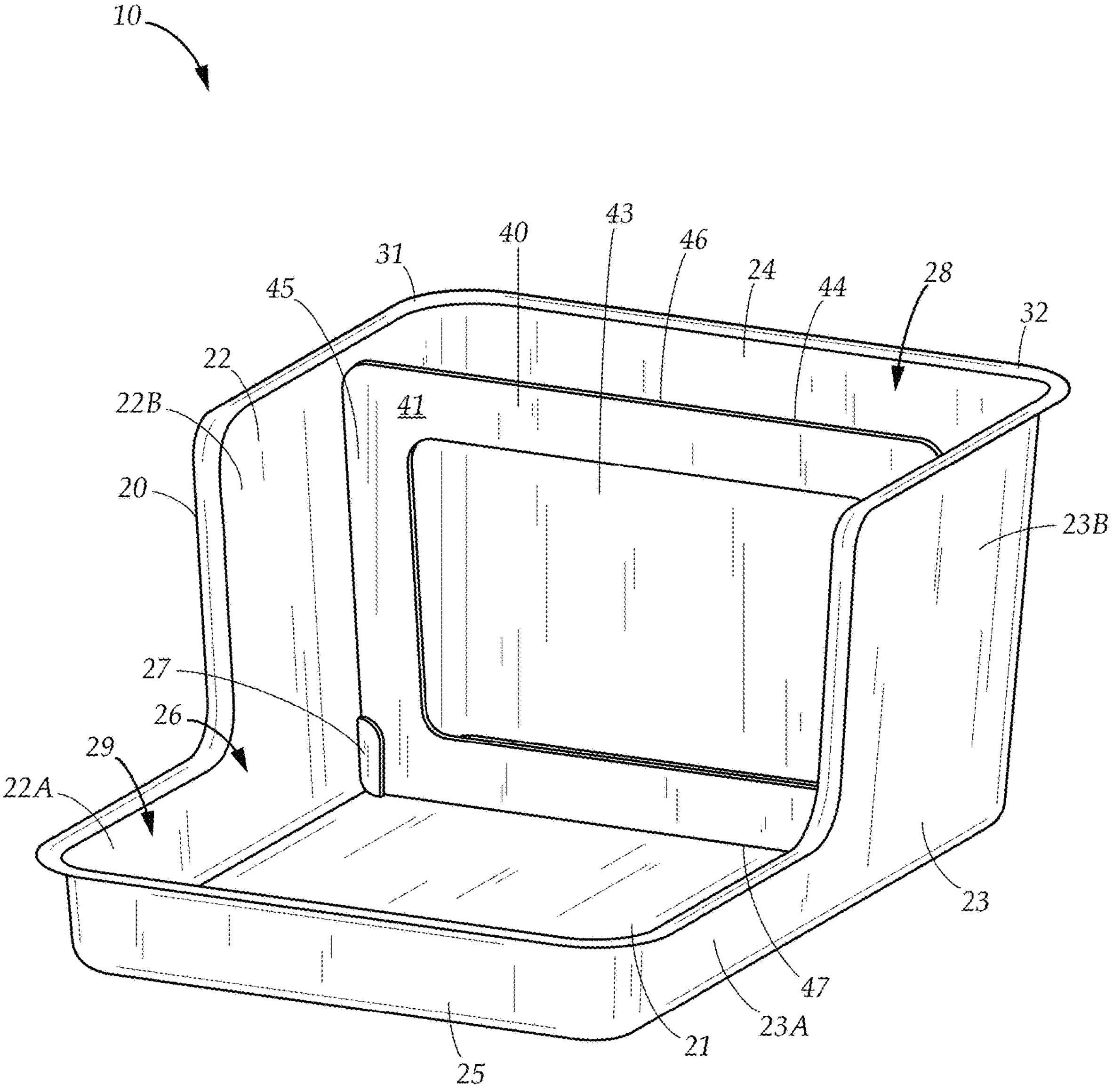
FIG. 1 shows a perspective view of the pet litter tray, illustrating the interchangeable divider installed in the tray in accordance with one embodiment of the present disclosure.
Figure 2:
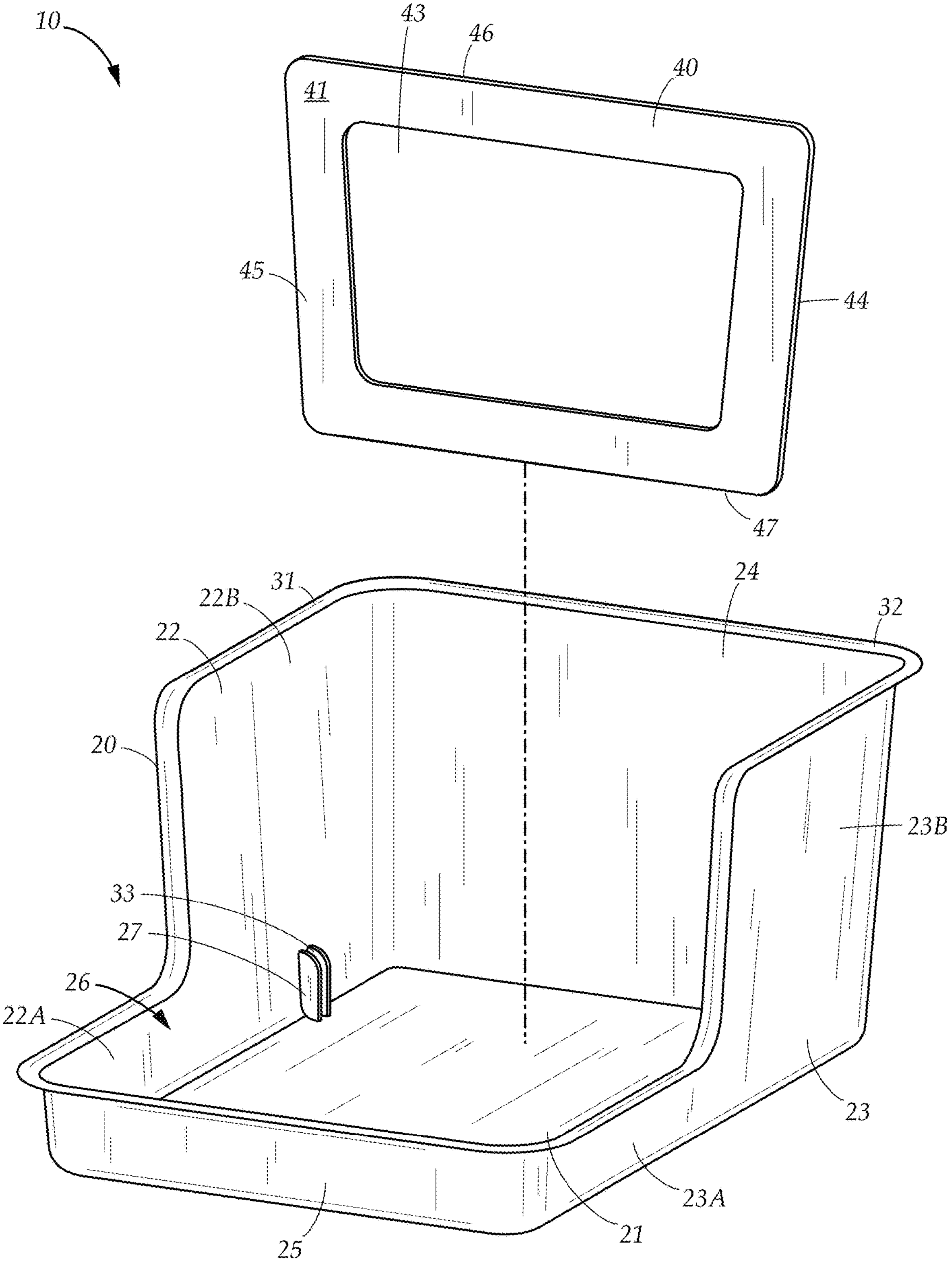
FIG. 2 shows an exploded view of the pet litter tray, illustrating one way in which the interchangeable dividers may be installed in the tray in accordance with one embodiment of the present disclosure.
Figure 3:
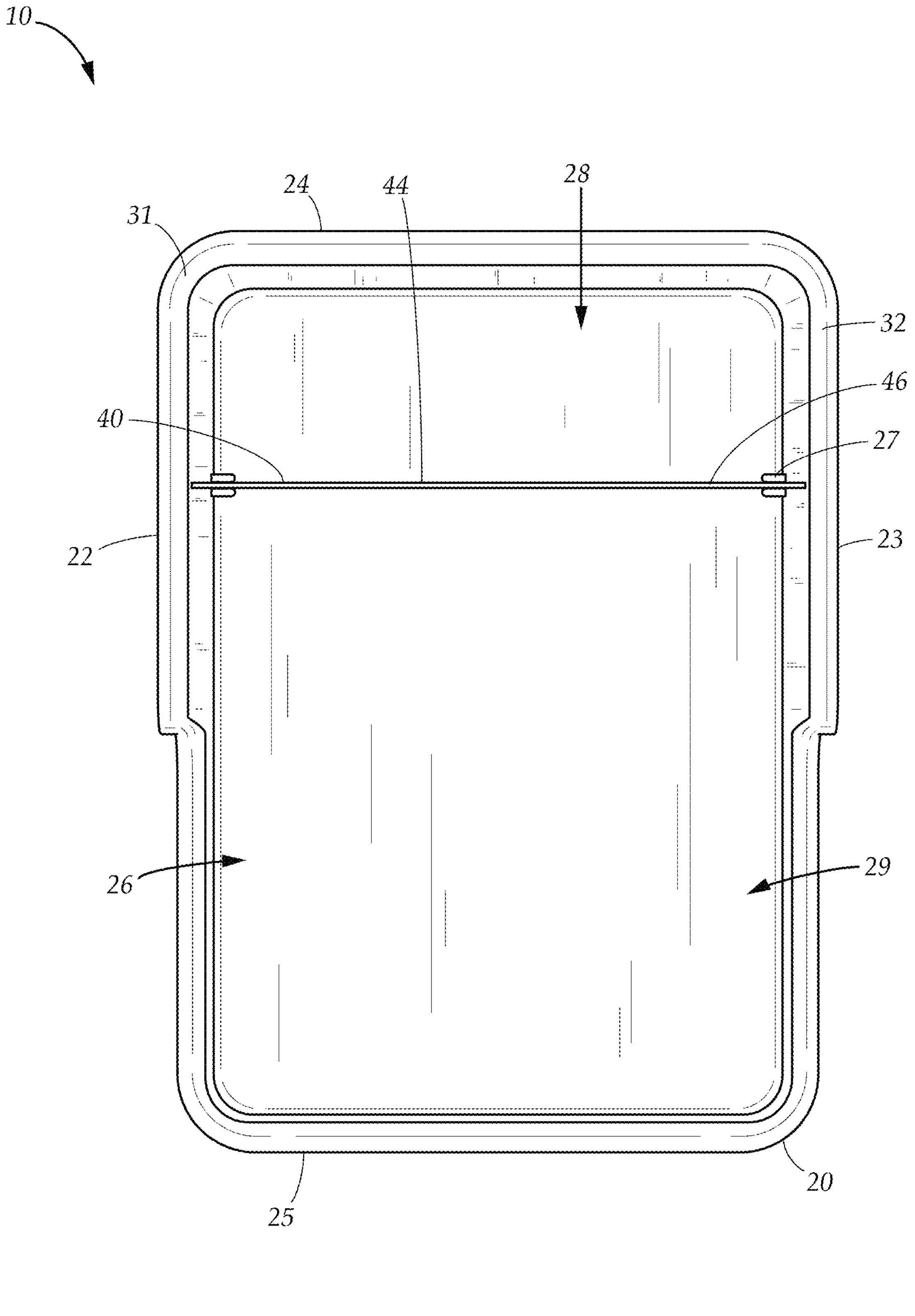
FIG. 3 shows a top plan view of the pet litter tray, illustrating the interchangeable divider installed in the tray in accordance with one embodiment of the present disclosure.
Figure 4A:
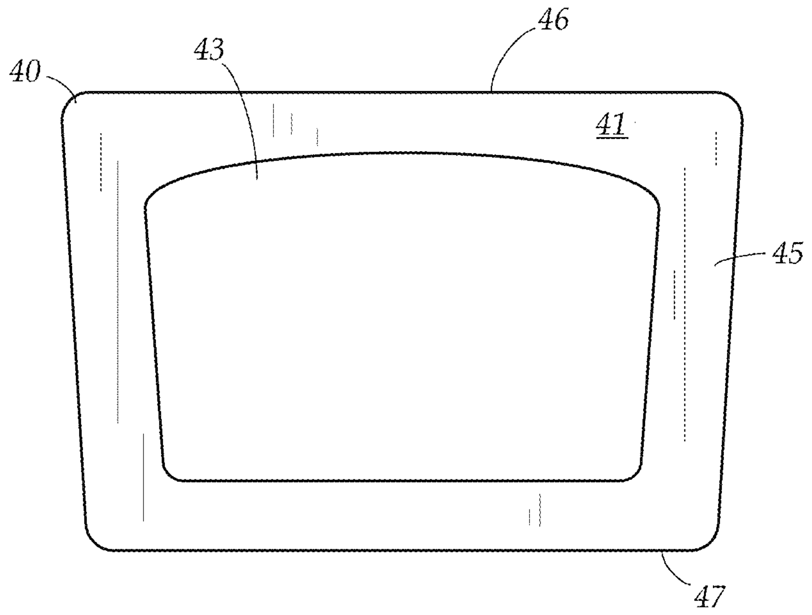
FIG. 4A shows a front plan view of the interchangeable divider in accordance with one embodiment of the present disclosure.
Figure 4B:
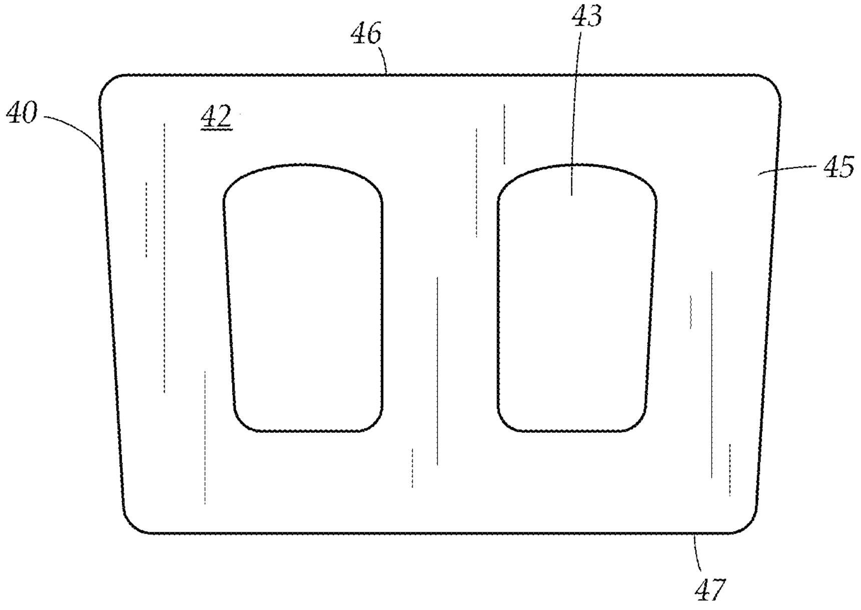
FIG. 4B shows a rear plan view of the interchangeable divider in accordance with another embodiment of the present disclosure.
Figure 4C:
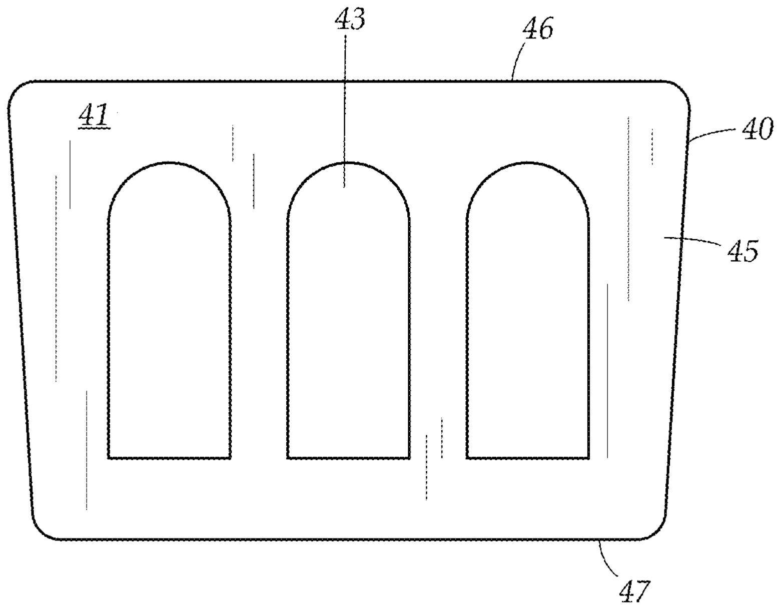
FIG. 4C shows a front plan view of the interchangeable divider in accordance with yet another embodiment of the present disclosure.
Figure 4D:
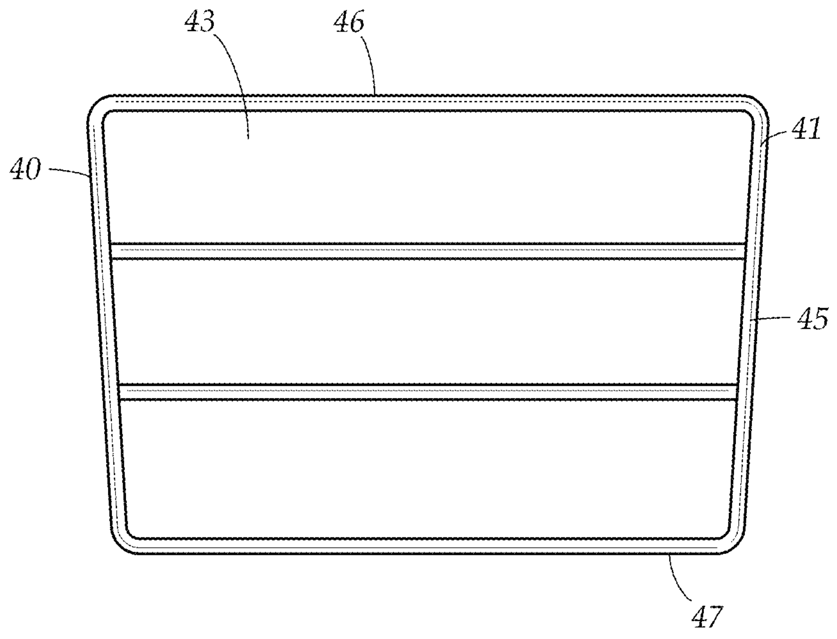
FIG. 4D shows a front plan view of the interchangeable divider in accordance with still another embodiment of the present disclosure.
Figure 5:
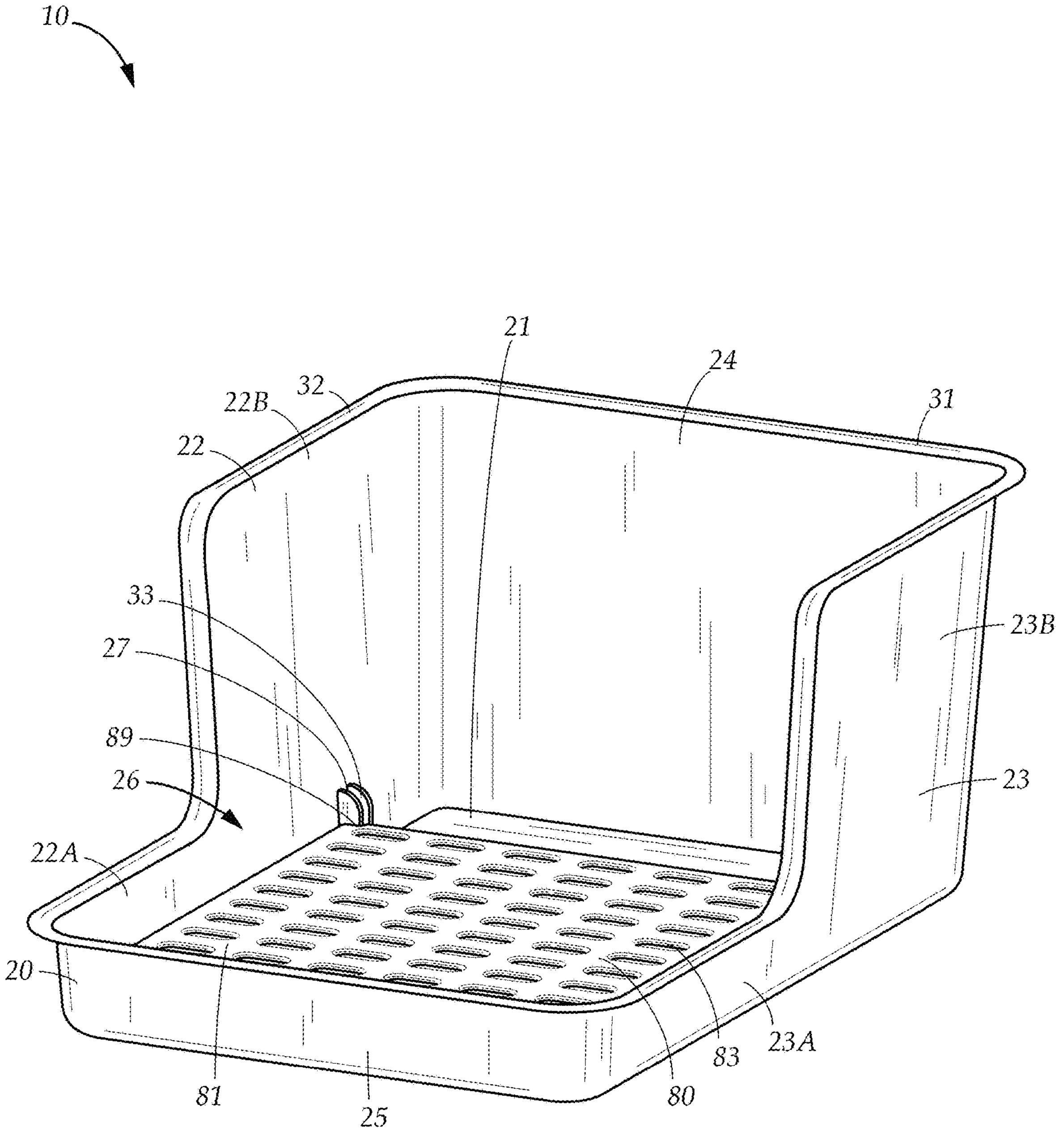
FIG. 5 shows a perspective view of the pet litter tray, illustrating the floor plate installed in the tray in accordance with one embodiment of the present disclosure.
Figure 6:
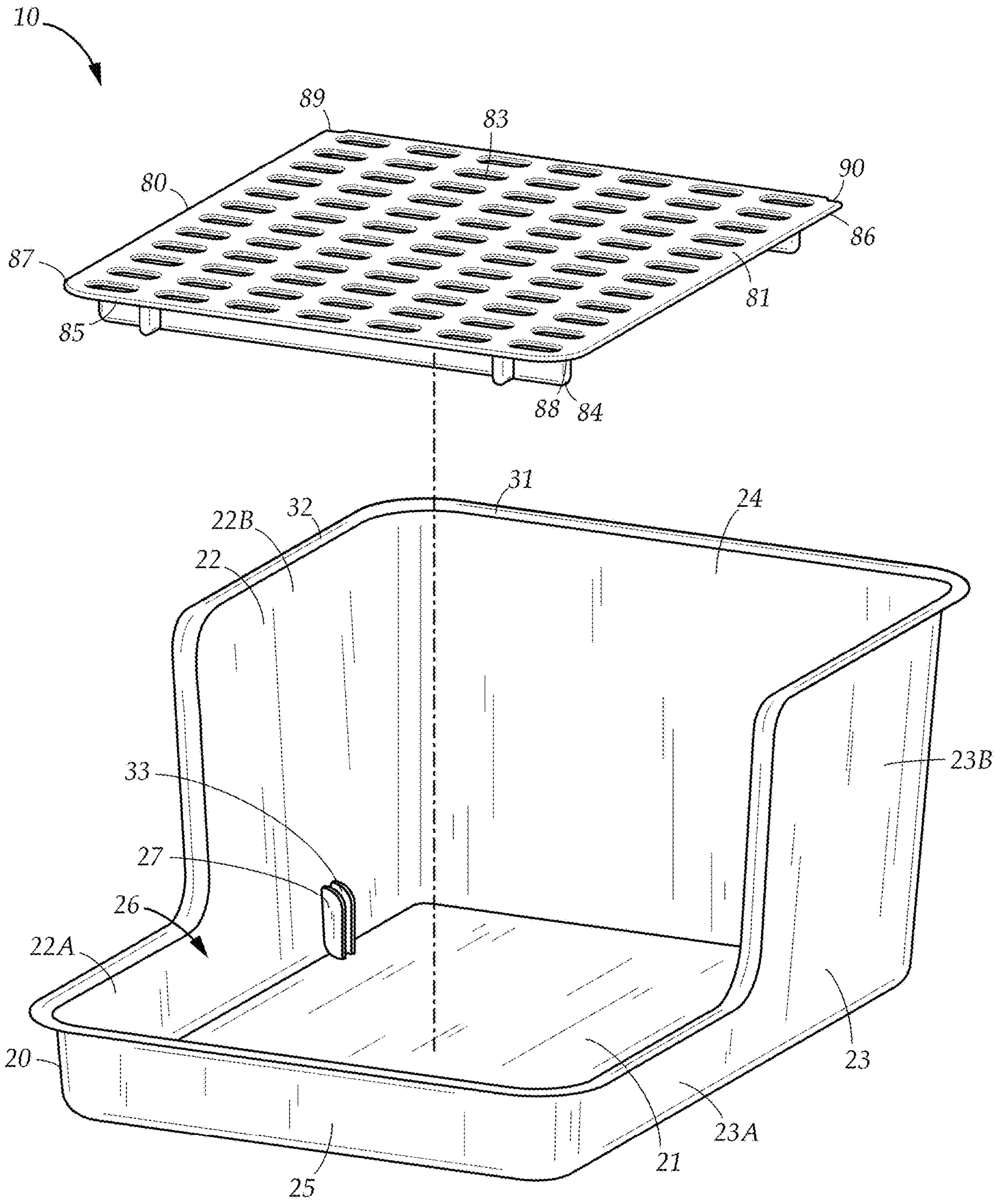
FIG. 6 shows an exploded view of the pet litter tray, illustrating one way in which the floor plate may be installed in the tray in accordance with one embodiment of the present disclosure.
Figure 7:
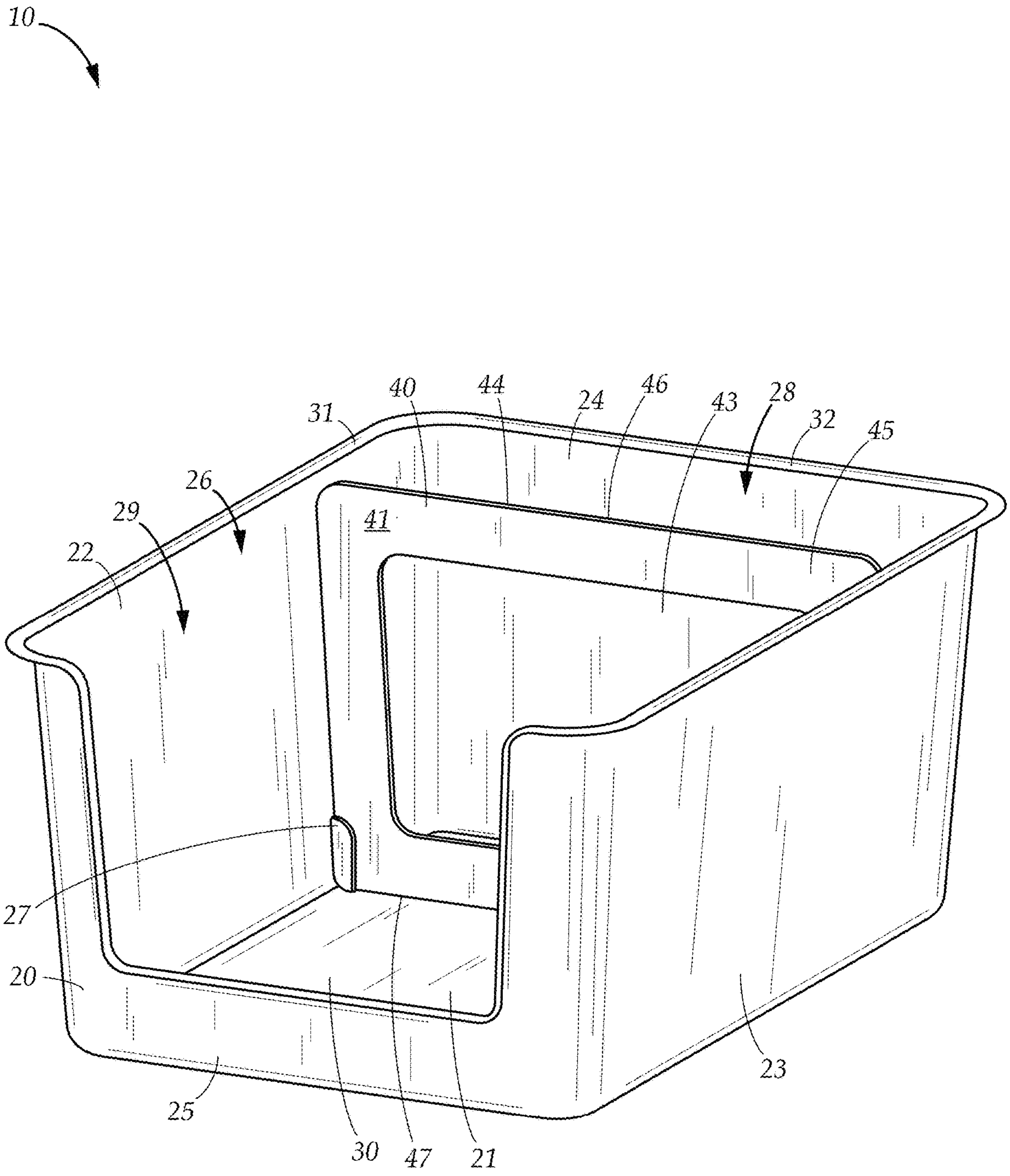
FIG. 7 shows a perspective view of the pet litter tray, illustrating the tray in accordance with another embodiment of the present disclosure.

The present disclosure will now be described more fully hereinafter with reference to the accompanying drawings, which show various example embodiments. However, the present disclosure may be embodied in many different forms and should not be constructed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

As discussed above, pet owners have recognized the importance of having an accessible and clean litter tray and feeding area for their pets to use to relieve themselves and eat, as well as the importance of easy transport and organization of pet accessories. Current products which address these concerns are limited to litter trays with fixed panels which limit accessibility, hinder cleaning, and are difficult to store and transport. While various attempts have been made to address these issues, these solutions are impractical. The embodiment disclosed herein address these and other issues.

Referring to FIG. 1, FIG. 2, FIG. 7, and FIG. 10, the present disclosure provides a pet litter tray 10 which enables easy access, organization, and cleaning. The pet litter tray 10 comprises a tray 20 and an interchangeable divider 40, wherein the interchangeable divider 40 enables the pet litter tray 10 to be divided into multiple sections. The interchangeable divider 40 is selectively attachable to the tray 20. The tray 20 comprises a base 21, a first sidewall 22, a second sidewall 23, a back wall 24, and a front wall 25. The first sidewall 22 and the second sidewall 23 interconnect the back wall 24 and the front wall 25. The first sidewall 22, the second sidewall 23, the back wall 24, and the front wall 25 extend upwardly from the base 21, defining an interior compartment 26. The interior compartment 26 comprises a food area 28 and a waste area 29. In embodiments, the base 21 is sloped and may include grates. In embodiments, the first sidewall 22, the second sidewall 23, the back wall 24, and the front wall 25 extend upwardly, substantially perpendicular to the base 21. In embodiments, the first sidewall 22, the second sidewall 23, the back wall 24, and the front wall 25 extend upwardly and outwardly from the base 21 at an angle. In embodiments, the first sidewall 22, the second sidewall 23, the back wall 24, and the front wall 25 are sloped or curved. The tray 20 includes a pair of receptacles 27 extending inwardly, substantially perpendicularly from the first sidewall 22. In embodiments, the pair of receptacles 27 are disposed on the base 21 at the junctures between the first sidewall 22 and the second sidewall 23, respectively. In other embodiments, the pair of receptacles 27 are disposed on the first sidewall 22 and second sidewall 23, only. The pair of receptacles 27 define the boundary or division between the food area 28 and the waste area 29. In embodiments, the food area 28 is adjacent to the back wall 24 and the waste area 29 is adjacent to the front wall 25. In other embodiments, the food area 28 is adjacent to the front wall 25 and the waste area 29 is adjacent to the back wall 24. The pair of receptacles 27 are configured to receive the interchangeable divider 40. In some embodiments, the pair of receptacles 27 include a groove 33 configured to slidably receive the interchangeable divider 40. In embodiments, a first lip 31 extends outwardly around the perimeter of the tray 20. In some embodiments, the first lip 31 extends substantially perpendicularly to a top end 32 of the first sidewall 22, the second sidewall 23, the back wall 24, and the front wall 25.

In embodiments, the first sidewall 22 and the second sidewall 23 undulate, such that the first sidewall 22 and the second sidewall 23 include a varying height. For example, in some embodiments, the first sidewall 22 and the second sidewall 23 each include a first portion 22A, 23A, respectively, adjacent to the front wall 25 and a second portion 22B, 23B adjacent to the back wall 24, wherein the first portions 22A, 23A each include a height smaller than the second portions 22B, 23B. This enables pets 50 to easily access the interior compartment from the sides or front of the tray 20. In embodiments, the first sidewall 22 and the second sidewall 23 include a unitary height, such that the height of the first sidewall 22 and the second sidewall 23 are substantially equivalent to the back wall 24. In embodiments, the back wall 24 includes a height substantially similar to the interchangeable divider 40 when the interchangeable divider 40 is attached to the tray 20. In embodiments, the front wall 25 and the back wall 24 include substantially equal heights. The front wall 25 includes an opening 30 for pets 50 to access the interior compartment 26. In embodiments, the tray 20 may include multiple openings 30 and the opening 30 may be located on the first sidewall 22, the second sidewall 23, the front wall 25, and the back wall 24. In yet another embodiment, the front wall 25 and the back wall 24 include a varying height, such that the front wall 25 is shorter than the back wall 24 thus enabling pets 50 to step over the front wall 25 to access the interior compartment 26. In some embodiments, the front wall 25 includes a height that is substantially equal to the height of the first portions 22A, 23A, of the first and second sidewalls 22, 23.

In embodiments, the pair of receptacles 27 comprises any locking system, such as tracks, grooves, channels, ribs, aligning posts, magnets, snap-fit tabs, sliding mechanisms, friction-fit methods, hinges, clips or a similar equivalent. In embodiments, the pair of receptacles 27 comprises a single receptacle, a plurality of side walls, or any equivalent structure capable of receiving and stabilizing the interchangeable divider 40. In embodiments, the tray 20 comprises wood, plastic, stainless steel, ceramic, polypropylene, or an equivalent material capable of supporting a pet 50. In embodiments, the tray 20 comprises paper-based materials and is disposable.

Referring now to FIG. 3, FIG. 4A, FIG. 4B, FIG. 4C, FIG. 4D, and FIG. 12, while continuing to refer to FIG. 1, FIG. 2, FIG. 7, and FIG. 10, in embodiments, the interchangeable divider 40 comprises a flat planar body 45 including a top end 46, a bottom end 47, a front surface 41, a back surface 42, and a panel side wall 44. The front surface 41 is substantially parallel to the back surface 42. The panel side wall 44 extends substantially perpendicular between the front surface 41 and the back surface 42. One or more holes 43 extend entirely through the interchangeable divider 40 from the front surface 41 to the back surface 42. The one or more holes 43 are configured to provide access to the food area 28, enabling the pet 50 to eat while securing the pet food 51 in the food area 28. In embodiments, the one or more holes 43 may comprise any shape, such as a square, rectangle, trapezoid, circle, or wired bars.

The interchangeable divider 40 slidably inserts and exits the pair of receptacles 27. The interchangeable divider 40 is configured to divide the waste area 29 and the food area 28. The waste area 29 is adjacent to the front wall 25 and is configured to receive the pet's waste. The food area 28 is adjacent to the back wall 24 and is configured to receive and store pet food 51. The waste area 29 and the food area 28 are configured to secure the waste and the pet food 51, respectively, and prevent the waste and food 51 from intermixing and creating a mess. In operation of some embodiments, the bottom end 47 of the interchangeable divider 40 is disposed adjacent to the base 21 when positioned within the pair of receptacles 27. In operation of some embodiments, the bottom end 47 of the interchangeable divider 40 makes contact with the base 21 when positioned within the pair of receptacles 27. In embodiments, the interchangeable divider 40 is substantially rectangular in shape and includes a width substantially equal to the width of the interior compartment 26. In other embodiments, the interchangeable divider 40 decreases in width from the top end 46 to the bottom end 47, such that the interchangeable divider 40 includes a smaller width adjacent to the base 21 and a greater width adjacent to the top end 32 of the first sidewall 22 and the second sidewall 23. In embodiments, the interchangeable divider 40 comprises wood, plastic, stainless steel, ceramic, polypropylene, or an equivalent material. In embodiments, the interchangeable divider 40 comprises a paper-based material and is disposable.

In operation of some embodiments, the interchangeable divider 40 is selectively received by the pair of receptacles 27 by first aligning the interchangeable divider 40 with the pair of receptacles 27. The user then vertically translates the interchangeable divider 40 downward towards the base 21. The interchangeable divider 40 engages the grooves 33 of the pair of receptacles 27 and makes contact with the base 21. In operation of some embodiments, the pair of receptacles 27 is positioned on the tray 20 horizontally or at an angle, thereby enabling the interchangeable divider 40 to be slidably attached to the pair of receptacles 27 horizontally, at an angle, or in an equivalent means. In operation of some embodiments, the interchangeable divider 40 is selectively disengaged from the pair of receptacles 27 by vertically translating the interchangeable divider 40 upwardly, thereby sliding the divider 40 out of the grooves 33 of the pair of receptacles 27. Once disengaged, the user can store the interchangeable divider 40.

Figure 12:
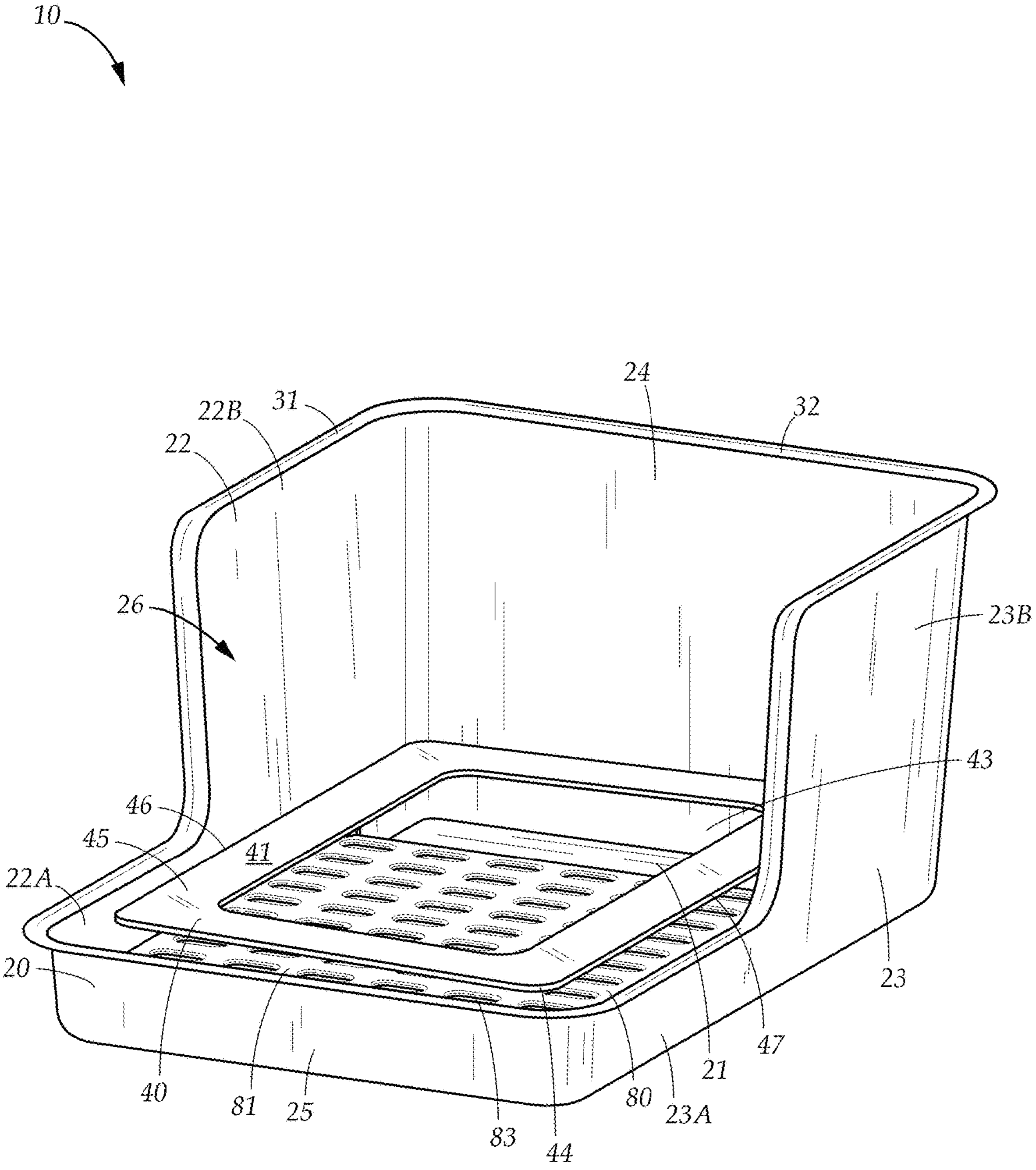
FIG. 12 shows a top perspective view of the pet litter tray in a disassembled configuration, illustrating the interchangeable divider uninstalled from the tray and positioned on the floor plate for storage in accordance with one embodiment of the present disclosure.
Figure 13:
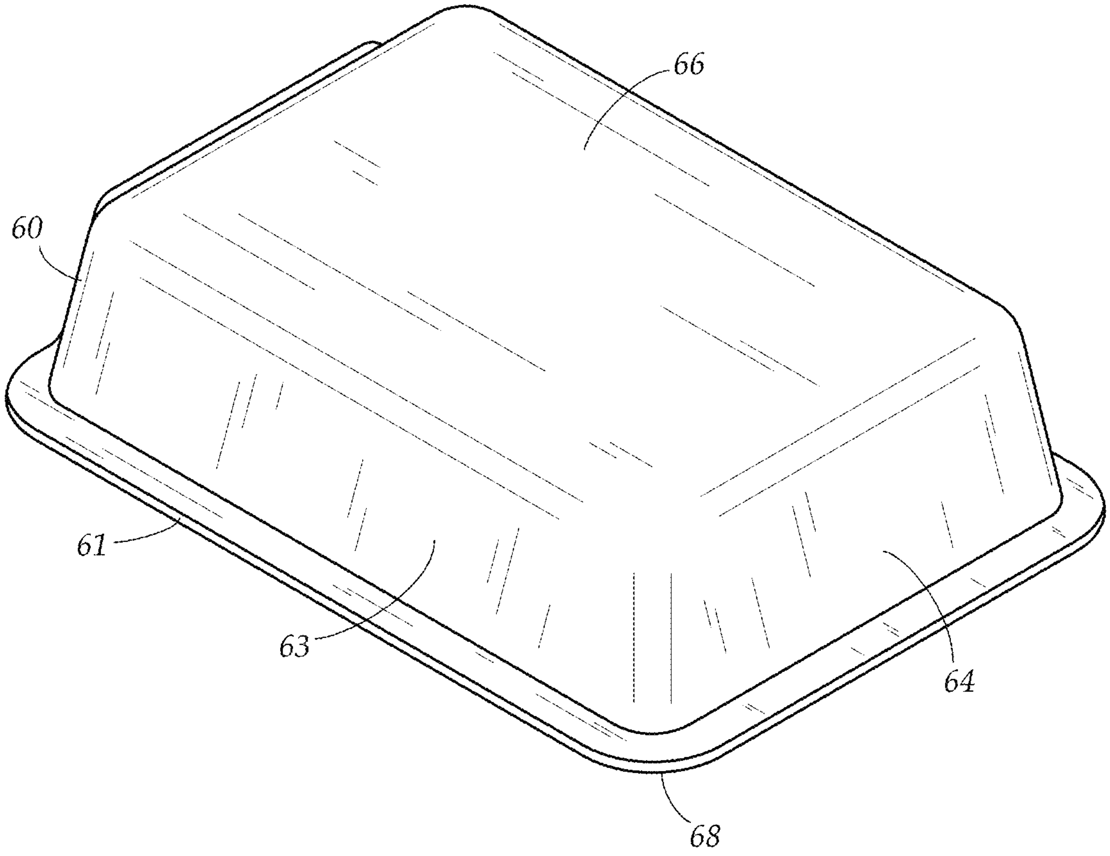
FIG. 13 shows a perspective view of the lid in accordance with one embodiment of the present disclosure.
Figure 14:
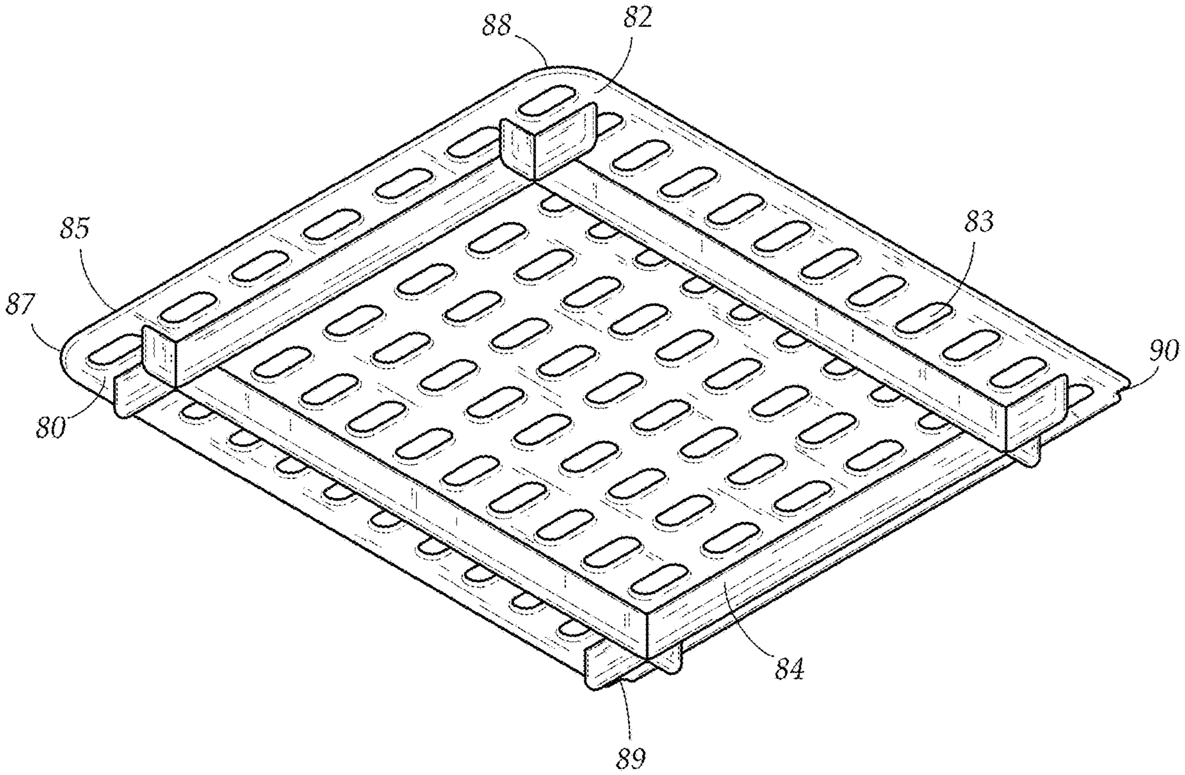
FIG. 14 shows a bottom perspective view of the floor plate in accordance with one embodiment of the present disclosure.

Referring now to FIG. 5, FIG. 6, FIG. 10, and FIG. 14, while continuing to refer to FIG. 12, in embodiments, the pet litter tray 10 further includes a removeable floor plate 80 that is selectively mountable over the waste area 29. The floor plate 80 includes a plurality of apertures 83 configured to filter pet waste excreted by the pet 50, by enabling the pet waste to fall through the apertures 83 and onto the base 21. In this way, the floor plate 80 enables storage of the pet waste underneath the floor plate 80 to prevent messes or the intermixing of the pet waste with the pet food 51. The floor plate 80 comprises a proximal end 85, a top surface 81, a bottom surface 82, a plate side wall 86, and the plurality of apertures 83. The top surface 81 is substantially parallel to the bottom surface 82. The plate side wall 86 extends substantially perpendicularly between the top surface 81 and the bottom surface 82. The plurality of apertures 83 extend entirely through the floor plate 80 from the top surface 81 to the bottom surface 82. This enables pet waste to fall through the floor plate 80 into the waste area 29, thus organizing the pet waste into one area for easy cleaning and prevents the pet from spreading the pet waste around and intermixing with the pet food 51. The floor plate 80 includes a first corner 87, a second corner 88, a third corner 89, and a fourth corner 90. The first corner 87 and the second corner 88 are adjacent to the proximal end 85. In embodiments, the first corner 87 and the second corner 88 are rounded. In other embodiments, the first corner 87 and the second corner 88 include a ninety-degree angle. The third corner 89 and the fourth corner 90 comprise an indent configured to engage the pair of receptacles 27. In embodiments, the bottom surface 82 includes a plurality of beams 84 which provide structural support for the floor plate 80. The plurality of beams 84 elevate the surface of the floor plate 80 with respect to the base 21 such that an area is formed between the base 21 and the floor plate 80 that is capable of receiving and containing the pet waste when filtered through the apertures 83. In embodiments, the floor plate 80 may comprise wood, plastic, stainless steel, ceramic, polypropylene, or an equivalent material capable of supporting a pet 50. In embodiments, the floor plate 80 comprises a paper-based material and is disposable.

In operation of some embodiments, the floor plate 80 is attached to the pet litter tray 10 by first aligning the floor plate 80 to the waste area 29. The user aligns the third corner 89 and the fourth corner 90 to the pair of receptacles 27. The user then vertically translates the floor plate 80 downward, such that the plurality of beams 84 contact the base 21, the proximal end 85 is positioned adjacent to the front wall 25, and the third and fourth corners 89, 90 engage the pair of receptacles 27. In embodiments, the user fills the waste area 29 with pet litter bedding and positions the floor plate 80 atop the pet litter bedding such that the plurality of beams 84 contact the pet litter bedding.

Figure 9:
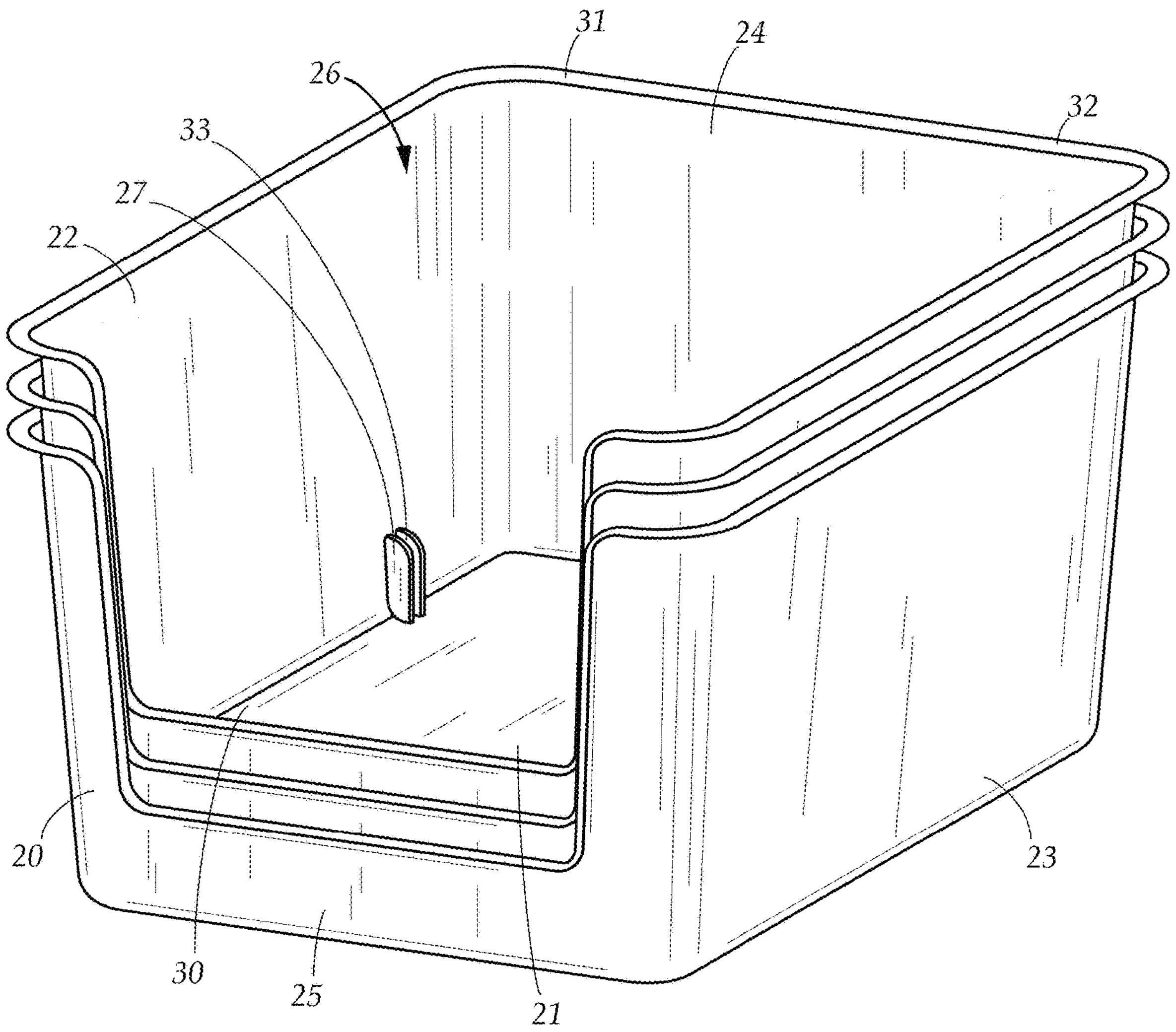
FIG. 9 shows a perspective view of the pet litter tray in a stacked configuration, illustrating the stackable nature of the pet litter tray in accordance with one embodiment of the present disclosure.
Figure 15:
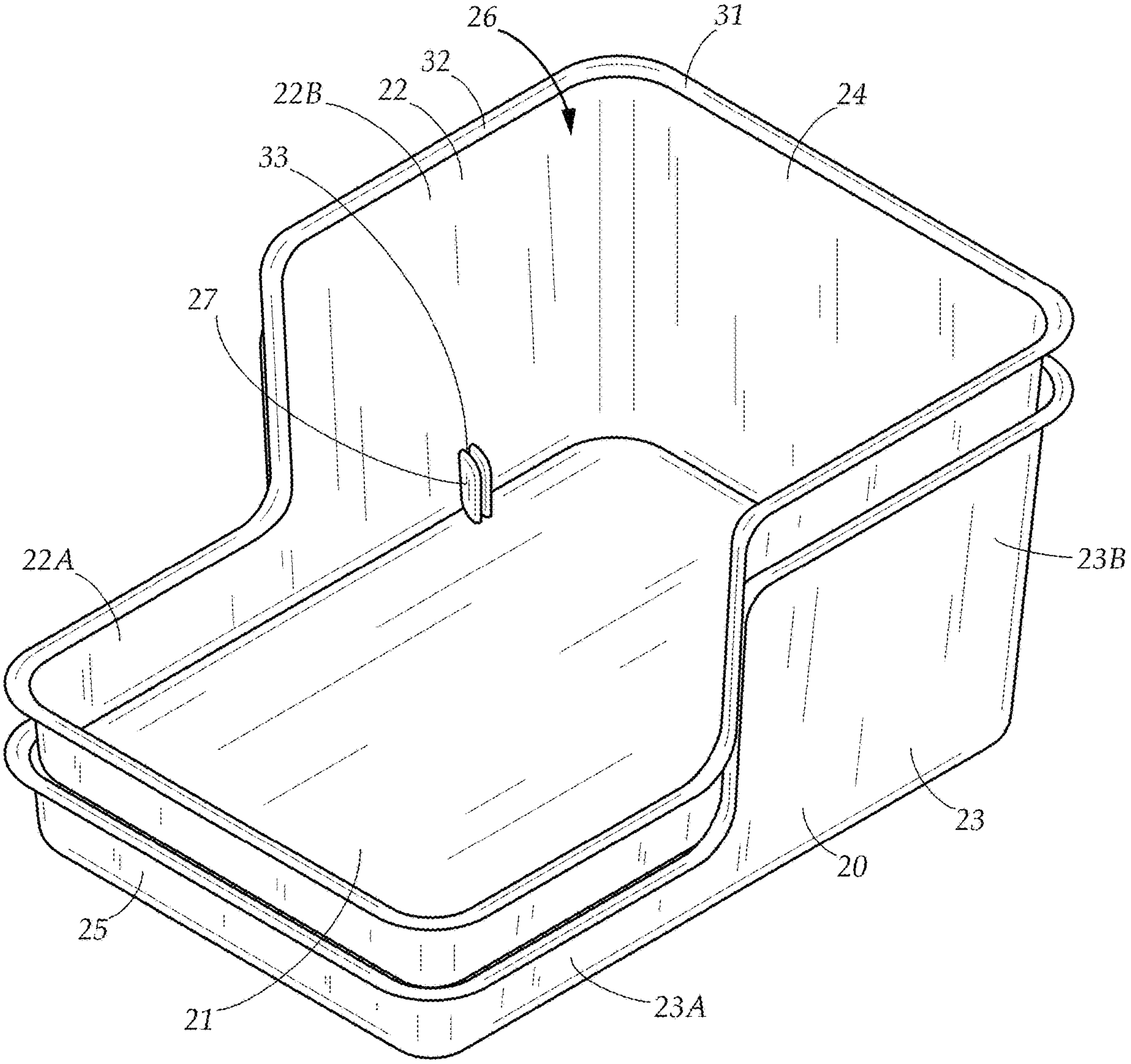
FIG. 15 shows a perspective view of the pet litter tray in a stacked configuration, illustrating the stackable nature of the pet litter tray in accordance with another embodiment of the present disclosure
Figure 16:
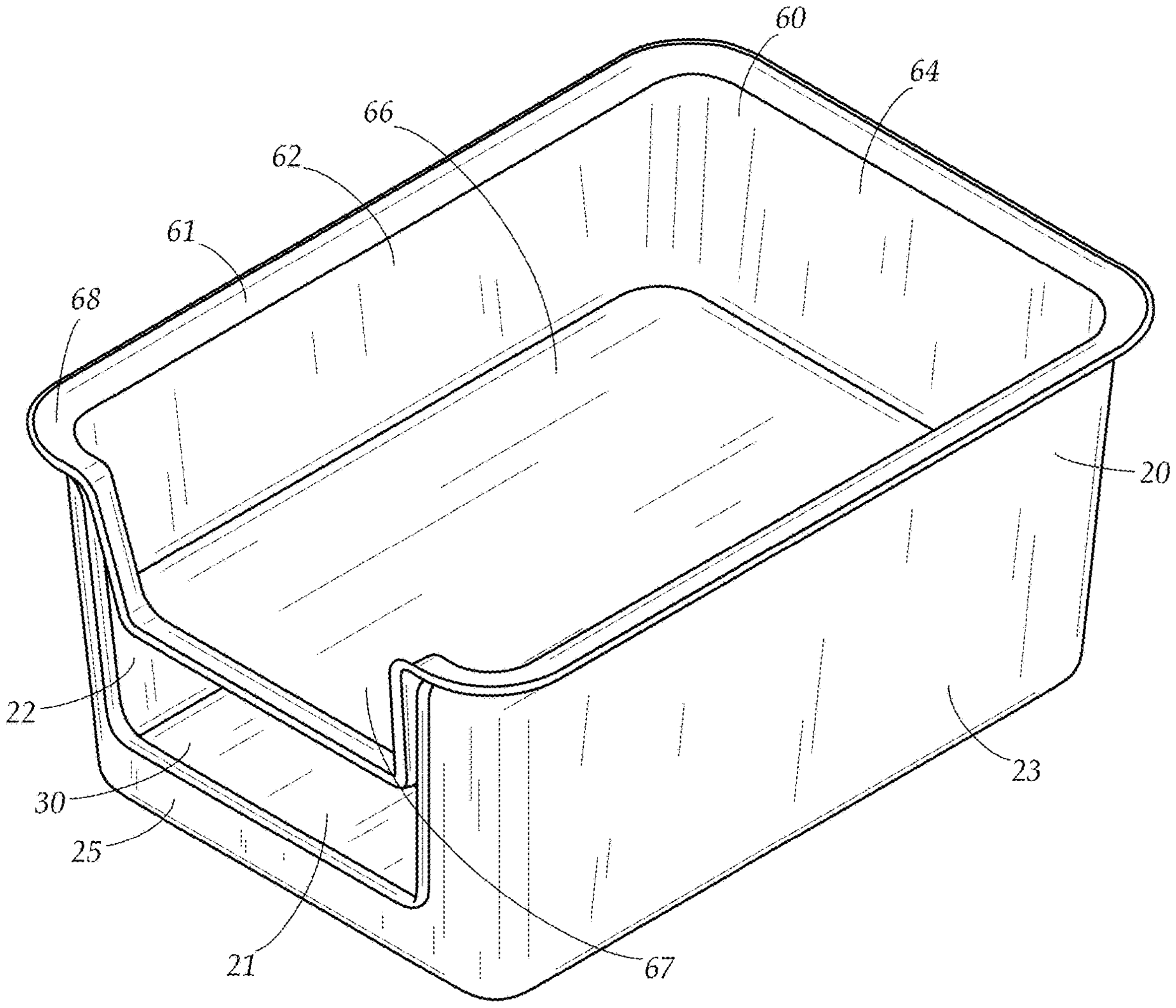
FIG. 16 shows a perspective view of the pet litter tray in a stacked configuration, illustrating the stackable nature of the pet litter tray in accordance with yet another embodiment of the present disclosure.

Referring now to FIG. 9 and FIG. 15 while continuing to refer to FIG. 1, FIG. 2, FIG. 5, and FIG. 6, in embodiments, the pet litter tray 10 is stackable, enabling easy storage and transportation. In operation of some embodiments, the user vertically translates the interchangeable divider 40 upwardly away from the base 21, disengaging the divider 40 from the pair of receptacles 27. In operation of some embodiments, the user vertically translates the floor plate 80 upwardly away from the base 21, removing it from the waste area 29. Once the interchangeable divider 40 and the floor plate 80 are removed, the user places the interchangeable divider 40 and the floor plate 80 into the interior compartment 26 of the tray 20. The user repeats this step with all additional pet litter trays 10. The user then stacks each pet litter tray 10 on top of each other, such that the trays 20 of the additional pet litter trays 10 sit inside the bottom pet litter tray's 10 interior compartment 26. The first lip 31 of each of the pet litter trays 10 are aligned and engage each other which supports and stabilizes each of the pet litter trays 10. This reduces the amount of space required for storage and enables easier transportation.

Referring now to FIG. 1, FIG. 8, FIG. 10, and FIG. 13, in embodiments, the pet litter tray 10 further includes a lid 60. The lid 60 comprises a roof 66, a third sidewall 62, a fourth sidewall 63, a closed sidewall 64, and an open sidewall 65. The third sidewall 62 and the fourth sidewall 63 interconnect the closed sidewall 64 and the open sidewall 65. The third sidewall 62, the fourth sidewall 63, the closed sidewall 64, and the open sidewall 65 extend downwardly from the roof 66. In embodiments, the third sidewall 62, the fourth sidewall 63, the closed sidewall 64, and the open sidewall 65 extend downwardly substantially perpendicular from the roof 66. In embodiments, the third sidewall 62, the fourth sidewall 63, the closed sidewall 64, and the open sidewall 65 extend downwardly at an outward angle from the roof 66. A second lip 61 extends outwardly, substantially perpendicular to a bottom end 68 of the third sidewall 62, the fourth sidewall 63, the closed sidewall 64, and the open sidewall 65. In embodiments, the second lip 61 is substantially similar in size to the first lip 31. The open sidewall 65 includes an opening 67 substantially the same width as the opening 30 of the front wall 25, enabling easy access to the enclosed pet litter tray 10. When the lid is placed onto the tray 20, the opening 67 of the open sidewall 65 aligns with the opening 30 of the front wall 25 creating a larger opening for ingress and egress of the pet 50. In embodiments, the lid 60 may comprise wood, plastic, stainless steel, ceramic, polypropylene, or an equivalent material. In embodiments, the lid 60 may comprise a paper-based material and is disposable. In embodiments, the lid 60 includes any shape, design, or configuration which is able to cover and enclose the tray 20. In embodiments, the pair of receptacles 27 is disposed on the base 21, the lid 60, the sidewalls 22, 23, the front wall 25, the back wall 24, or any combination thereof.

In embodiments, the lid 60, tray 20, interchangeable divider 40, and floor plate 80 are connected by a mechanical fastener, an adhesive, or any equivalent fastener that connects the components.

Figure 8:
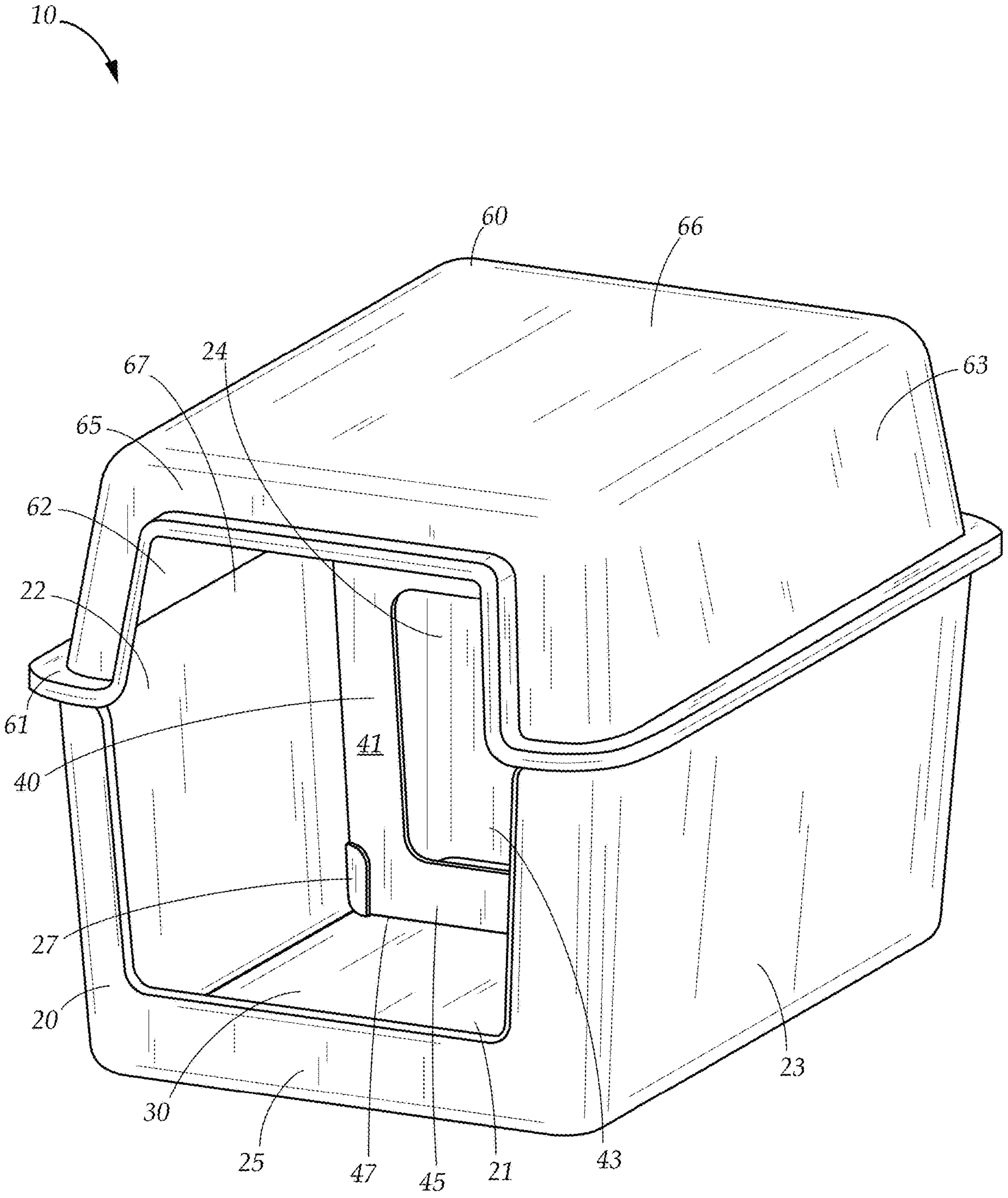
FIG. 8 shows a perspective view of the pet litter tray, illustrating the lid mounted onto the pet litter tray in accordance with one embodiment of the present disclosure.

Referring now to FIG. 1, FIG. 2, FIG. 5, FIG. 6, FIG. 13, and FIG. 16, while continuing to refer to FIG. 8, in embodiments, the enclosed pet litter tray 10 may be stacked, enabling easy storage and transportation. For example, in operation of some embodiments, the user first vertically translates the lid 60 upwardly, removing the lid 60 from the tray 20. The user then vertically translates the interchangeable divider 40 upwardly, disengaging the interchangeable divider 40 from the pair of receptacles 27. The user then vertically translates the floor plate 80 upwardly away from the base 21, disengaging the floor plate 80 from the waste area 29. The user then removes the pet litter bedding from the pet litter tray 10. The user then places the interchangeable divider 40 into the interior compartment 26 of the tray 20. Next, the user places the floor plate 80 into the interior compartment 26 of the tray 20. The user then rotates the lid 60 ninety degrees such that the third sidewall 62, the fourth sidewall 63, the closed sidewall 64, and the open sidewall 65 extend upwardly from the roof 66. The user then aligns the first lip 31 and the second lip 61 and vertically translates the lid 60 downward, towards the tray 20 until the first lip 31 and the second lip 61 engage. This secures the lid 60 to the tray 20, minimizing the space occupied by the pet litter trays 10.

Figure 10:
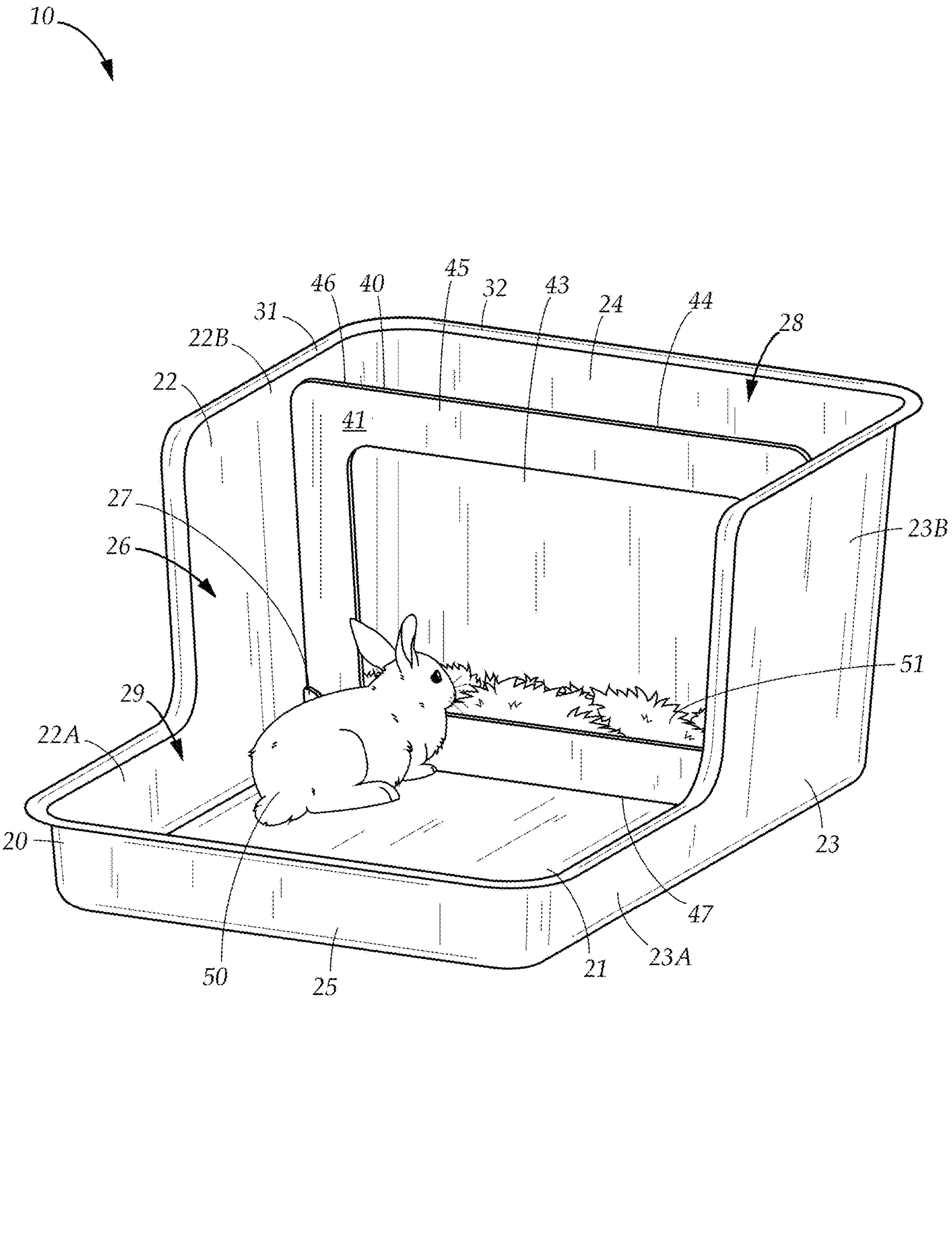
FIG. 10 shows a top perspective view of the pet litter tray in use in accordance with one embodiment of the present disclosure.
Figure 11:
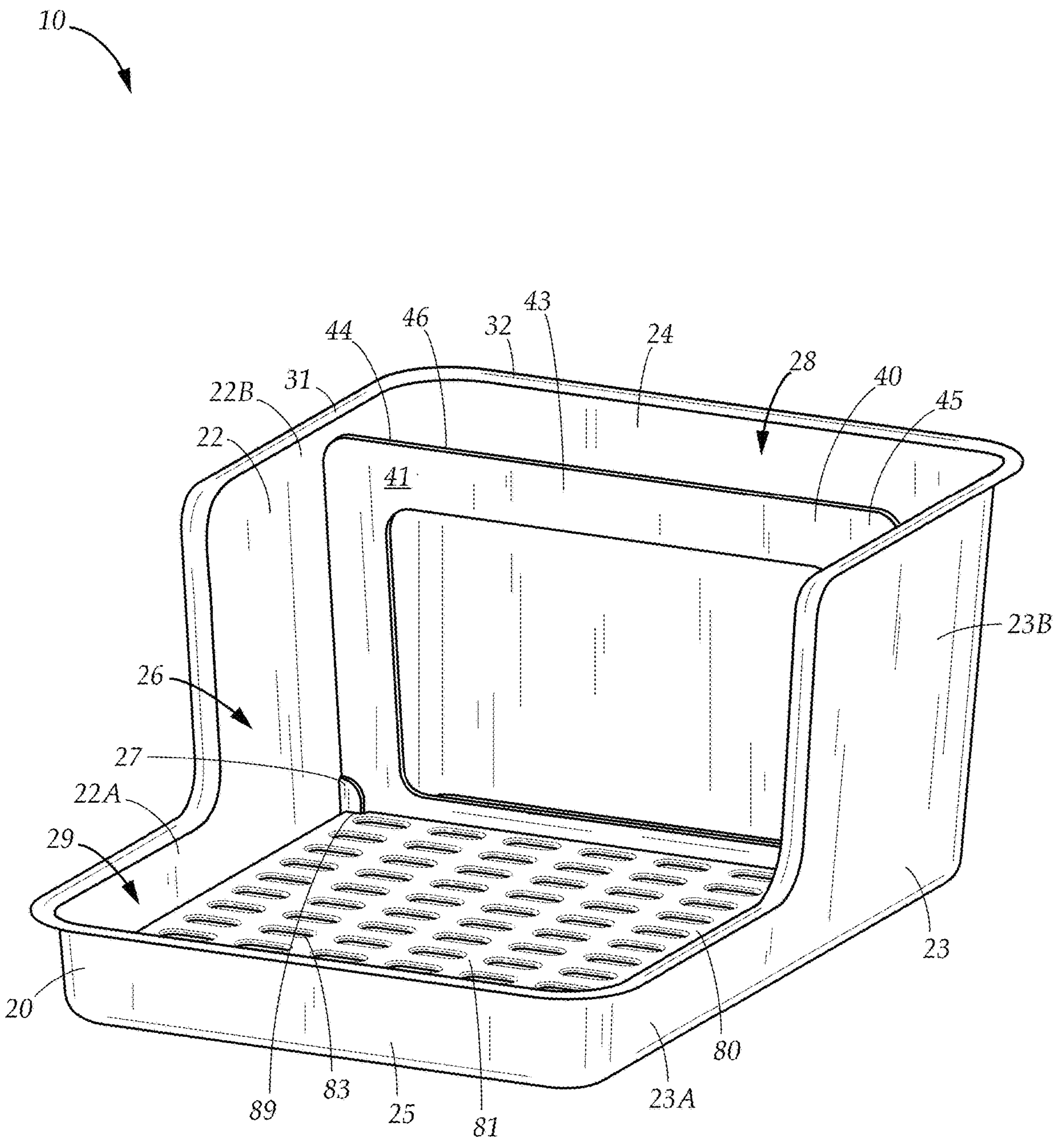
FIG. 11 shows a top perspective view of the pet litter tray in an assembled configuration, illustrating both the interchangeable divider and the floor plate installed in the tray in accordance with one embodiment of the present disclosure.

Referring now to FIG. 10, FIG. 11, and FIG. 12, while continuing to refer to FIG. 1, FIG. 2, FIG. 5, FIG. 6, and FIG. 8, in operation of some embodiments, the user assembles the pet litter tray 10 by first attaching the interchangeable divider 40 to the tray 20. The user aligns the interchangeable divider 40 with the grooves 33 of the pair of receptacles 27 and vertically translates the interchangeable divider 40 downwardly towards the base 21 and into the grooves 33, thereby engaging the pair of receptacles 27. In operation of embodiments, the user then places pet litter bedding into the waste area 29. The user then aligns the floor plate 80 to the waste area 29 and vertically translates the floor plate 80 downwardly, such that the plurality of beams 84 contact the base 21 or the pet litter bedding and the proximal end 85 is positioned adjacent to the front wall 26. The user then fills the food area 28 with pet food 51. In operation of some embodiments, the user attaches the lid 60 to the tray 20 by aligning the first lip 31 with the second lip 61 and the opening 67 of the lid 60 with the opening 30 of the front wall 25 then vertically translating the lid 60 downwardly toward the tray 20, engaging the first lip 31 and the second lip 61. The pet 50 can then access and use the pet litter tray 10.

It is understood that features such as height, shape, and dimensions illustrated in the figures are not limiting. Thus, a feature may include a different height, shape, and dimension as shown in the figures. Such variations are contemplated as being part of the disclosure. It is understood that the figures are exemplary only, variations are contemplated as being part of the disclosure.

It is understood that when an element is referred hereinabove as being "on" another element, it can be directly on the other element or intervening elements may be presented therebetween. In contrast, when an element is referred to as being "directly on" another element, there is no intervening element present.

Moreover, any compounds or materials can be formed from a same, structurally continuous piece, or separately fabricated and connected.

It is further understood that, although ordinal terms, such as "first", "second", "third", are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element", "component", "region", "layer", or "section" discussed below could be termed a second element, component, region, layer, or section without departing from the teachings herein.

Spatially, relative terms, such as "beneath", "below", "lower", "above", "upper", and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly. The term "substantially" is defined as at least 95% of the term and being descripted and/or within a tolerance level known in the art and/or within 5% thereof.

Example embodiments are described herein with references to cross sections illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviation in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a pet litter tray 10. The disclosure is illustrated by example in the drawing figures, and throughout the written description. It should be understood that numerous variations are possible, while adhering to the inventive scope. Such variations are contemplated as being part of the present disclosure.

What is claimed is:

1. A pet litter tray, comprising:

a tray including a base, a first sidewall, a second sidewall, a back wall, a front wall, and a first lip, the first sidewall and the second sidewall interconnect the back wall and the front wall, the first sidewall, the second sidewall, the back wall, and the front wall extending upwardly from the base defining an interior compartment, the interior compartment comprising a food area and a waste area, a pair of receptacles extending inwardly toward the interior compartment from the base or either of the first sidewall or the second sidewall;

an interchangeable divider configured to selectively attach to the tray thereby dividing the tray into multiple sections, the divider comprising a planar body including a top end, a bottom end, a front surface, a back surface, a panel side wall, and a hole, the front surface substantially parallel to the back surface, the panel side wall extending substantially perpendicular between the front surface and the back surface, the hole extending entirely through the interchangeable divider from the front surface to the back surface;

the pair of receptacles configured to slidably receive the interchangeable divider, the interchangeable divider defining the food area and the waste area when attached to the tray, the food area configured to receive and house animal food and the waste area configured to receive and house pet waste; and a removable floor plate comprising a proximal end, a top surface, a bottom surface, a plate side wall, a plurality of beams, and a plurality of apertures, the top surface substantially parallel to the bottom surface, the plate side wall extending substantially perpendicular between the top surface and the bottom surface, the plurality of apertures extending entirely through the floor plate from the top surface to the bottom surface, the bottom surface including the plurality of beams, the floor plate further including a first corner, a second corner, a third corner, and a fourth corner, wherein the first corner and the second corner are adjacent to the proximal end and the third corner and the fourth corner include an indent configured to engage the pair of receptacles.

2. The pet litter tray of claim 1, wherein:

the first sidewall and the second sidewall each include a first portion adjacent to the front wall and a second portion adjacent to the back wall, wherein the first portions each include a height smaller than the second portions;

the back wall includes a height substantially equal to the interchangeable divider when the interchangeable divider is attached to the pet litter tray;

the front wall includes a height substantially equal to the height of the first portions of the first sidewall and the second sidewall.

3. The pet litter tray of claim 1, wherein the first sidewall, the second sidewall, the front wall, and the back wall are substantially the same height, the front wall includes a first opening for pets to access the interior compartment.

4. The pet litter tray of claim 3, wherein:

the pet litter tray further includes a lid comprising a roof, a third sidewall, a fourth sidewall, a closed sidewall, an open sidewall, and a second lip, the third sidewall and the fourth sidewall interconnect the closed sidewall and the open sidewall, the third sidewall, the fourth sidewall, the closed sidewall, and the open sidewall extend downwardly from the roof, the second lip extends outwardly substantially perpendicular to a bottom end of the third sidewall, the fourth sidewall, the closed sidewall, and the open sidewall;

the third sidewall, the fourth sidewall, the closed sidewall, and the open sidewall comprising substantially the same height, the open sidewall including a second opening substantially the same width as the first opening of the front wall.

5. The lid of claim 4, wherein the third sidewall, the fourth sidewall, the closed sidewall, and the open sidewall extend downwardly substantially perpendicular from the roof.

6. The lid of claim 4, wherein the third sidewall, the fourth sidewall, the closed sidewall, and the open sidewall extend downwardly at an outward angle from the roof.

7. The pet litter tray of claim 4, wherein:

the tray comprises wood, plastic, stainless steel, ceramic, polypropylene, paper-based material, disposable material, or an equivalent material;

the interchangeable divider comprises wood, plastic, stainless steel, ceramic, polypropylene, paper-based material, disposable material, or an equivalent material;

the pair of receptacles disposed on the base, the lid, the sidewalls, the front wall, the back wall, or any combination thereof;

the base is sloped and may include grates.

8. The pet litter tray of claim 1, wherein the pair of receptacles are disposed on the base at the junctures between the first sidewall and the second sidewall.

9. The pet litter tray of claim 1, wherein the first lip extends outwardly around the perimeter of the tray, substantially perpendicular to a top end of the first sidewall, the second sidewall, the back wall, and the front wall.

10. The pet litter tray of claim 1, wherein the bottom end of the interchangeable divider is positioned adjacent to the base when attached to the pair of receptacles, such that the divider completely separates the food area and the waste area, thereby preventing the food and waste from intermixing.

11. The pet litter tray of claim 1, wherein the hole of the interchangeable divider comprises any shape, such as a rectangle, trapezoid, circle, square, or wired bar.

12. The pet litter tray of claim 1, wherein the hole of the interchangeable divider provides access to the pet food stored in the food area.

13. The pet litter tray of claim 1, wherein:

the first sidewall, the second sidewall, the back wall, and the front wall extend upwardly and outwardly from the base at an angle;

the interchangeable divider includes a width that decreases from the top end to the bottom end.

14. The pet litter tray of claim 1, wherein:

the first sidewall, the second sidewall, the back wall, and the front wall extend upwardly, substantially perpendicular to the base;

the interchangeable divider is substantially rectangular in shape and includes a width substantially equal to the width of the interior compartment.

15. The pet litter tray of claim 1, wherein:

the pair of receptacles comprises any locking mechanism;

the pair of receptacles comprises two receptacles, a plurality of side walls, a single receptacle, or any equivalent structure capable of receiving and stabilizing the interchangeable divider.

16. The pet litter tray of claim 1, wherein the pair of receptacles extends inwardly toward the interior compartment from the base or either of the first sidewall or the second sidewall horizontally or at an angle, enabling the interchangeable divider to be slidably attached to the receptacles by translating the interchangeable divider horizontally, at an angle, or in any equivalent means.

17. The floor plate of claim 1, wherein the floor plate comprises wood, plastic, stainless steel, ceramic, polypropylene, paper-based material, disposable material, or an equivalent material.

* * * * *